United States Patent [19]

Krüger et al.

[11] Patent Number: 5,463,946
[45] Date of Patent: Nov. 7, 1995

[54] CONTINUOUSLY OPERATING MATERIAL PRESS WITH LUBRICATING FILM FOR REDUCING FRICTION

[75] Inventors: Manfred Krüger; Dieter Mayer, both of Hannover; Frierich-Otto Behrens, Garbsen; Manfred Krohn, Ronnenberg, all of Germany

[73] Assignee: Hermann Berstorff Maschinenbau GmbH, Hannover, Germany

[21] Appl. No.: 261,118

[22] Filed: Jun. 14, 1994

[30] Foreign Application Priority Data

Jun. 14, 1993 [DE] Germany ............................ 43 19 663.2
Dec. 17, 1993 [DE] Germany ............................ 43 43 223.9

[51] Int. Cl.$^6$ ................................ B30B 3/00; B30B 15/34
[52] U.S. Cl. ................ 100/93 RP; 100/153; 156/583.5; 162/358.5; 425/107; 425/373
[58] Field of Search .............................. 100/93 RP, 151, 100/153, 154; 162/358.1, 358.3, 358.5; 156/583.5; 184/15.1; 425/107, 373

[56] References Cited

U.S. PATENT DOCUMENTS

| 741,257 | 10/1903 | Lawrence | 100/151 |
|---|---|---|---|
| 2,351,861 | 6/1944 | Knowland et al. | 425/373 |
| 3,799,052 | 3/1974 | Küsters et al. | 100/154 |
| 4,431,045 | 2/1984 | Josefsson | 162/358 |
| 4,826,555 | 5/1989 | Long | 156/583.5 |
| 5,229,139 | 7/1993 | Haupt | 100/151 |
| 5,320,036 | 6/1994 | Krohn et al. | 100/154 |

FOREIGN PATENT DOCUMENTS

| 53-10673 | 1/1978 | Japan | 425/107 |
|---|---|---|---|
| 2253220 | 9/1992 | United Kingdom . | |

*Primary Examiner*—Stephen F. Gerrity
*Attorney, Agent, or Firm*—Foley & Lardner

[57] ABSTRACT

A continuous material press for the production of material sheets made of substances which require a high pressure and an intensive thickness reduction during the pressing process, with the press including a heated/cooled and driven central drum, and a circulating endless steel belt tensioned around the central drum, with the material to be pressed being guided and pressed between the shell surface of the central drum and the steel belt. An additional stationary pressing device comprised of elastic steel belt sections is located outwardly of the endless steel belt and is mounted in tension to variably increase the pressure on the endless steel belt and thus on the material. An opening is formed in the steel belt section mounted in which is a pipe for delivering compressed air or water vapor to interface on the endless steel belt and the stationary steel belt section, the compressed air or water vapor forming a lubricating film for reducing friction.

7 Claims, 5 Drawing Sheets

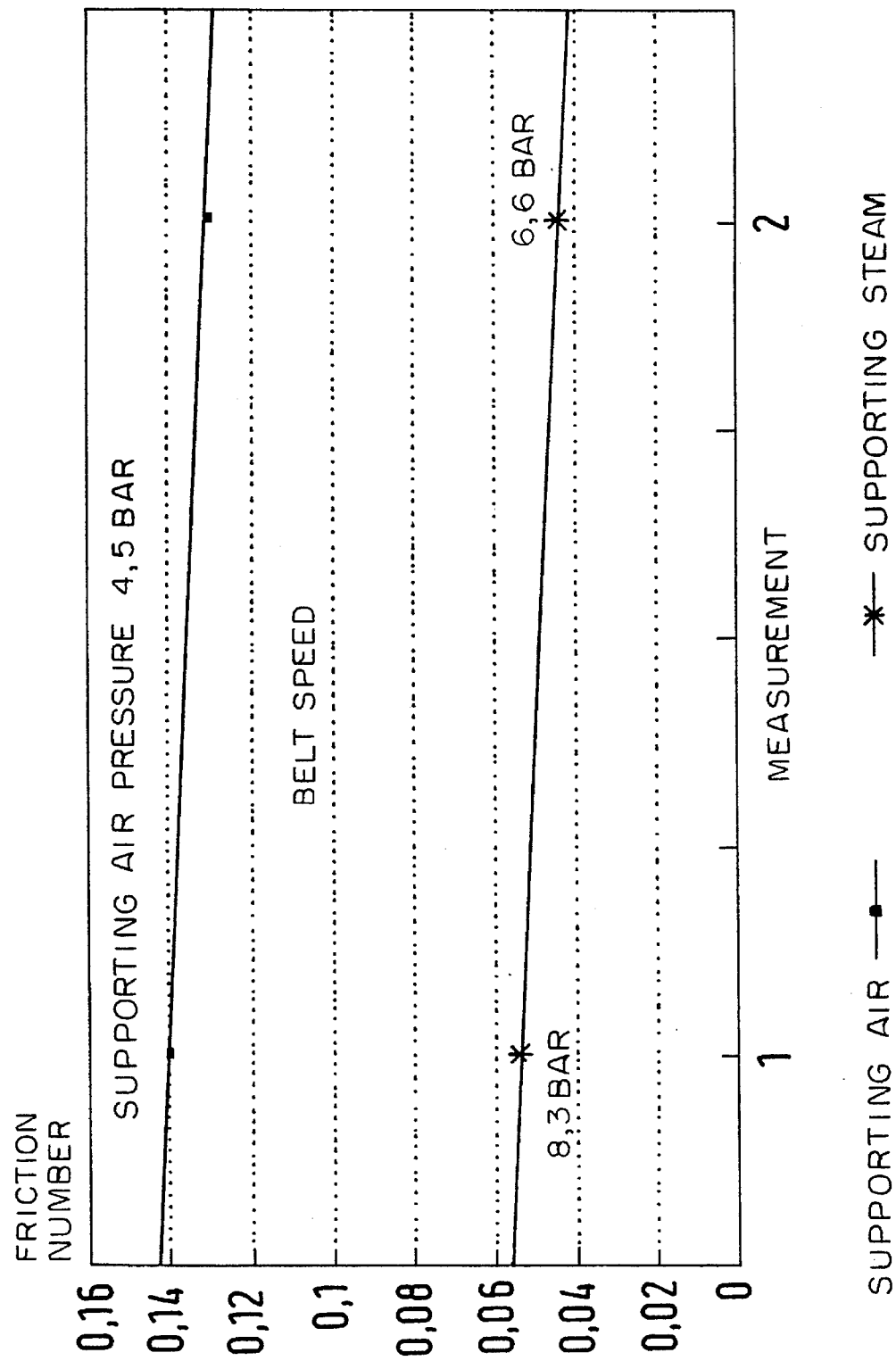

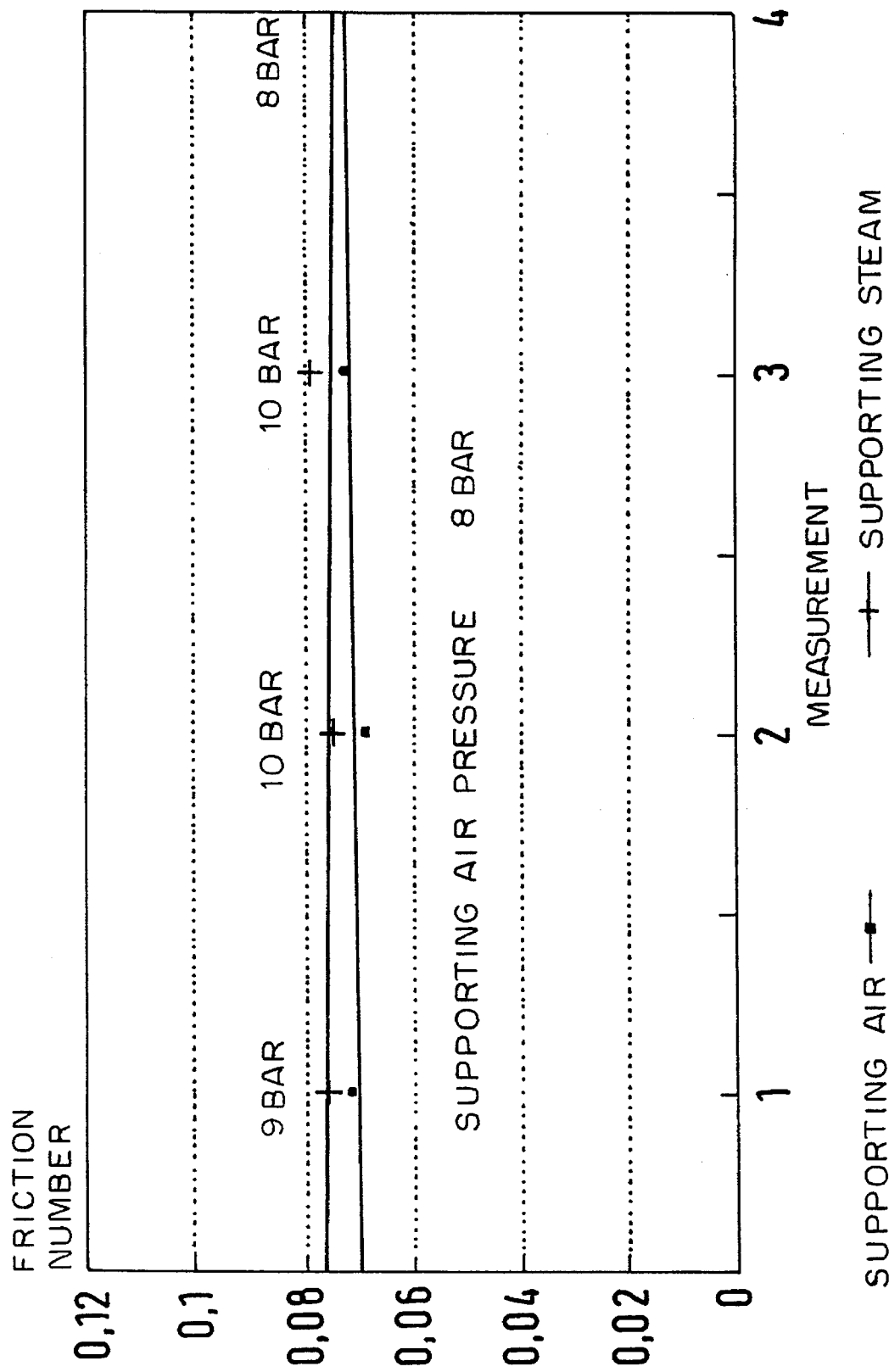

5,463,946

CONTINUOUSLY OPERATING MATERIAL PRESS WITH LUBRICATING FILM FOR REDUCING FRICTION

BACKGROUND OF THE INVENTION

The invention relates to a continuously operating material press for producing, for example, endless composite, particle, fiber rubber and plastic sheets and paper or substances impregnated with synthetic resin. The press typically includes a driven central drum having an outer shell surface and which can be heated or cooled, and reversing drums and a tensioning drum. A circulating endless steel belt is tensioned around and engages a substantial portion of the central drum. The material to be processed into sheet form is guided into the space between the endless belt and the central drum and pressed in the region of the shell surface tightly engaged by the tensioned steel belt.

This type of press is particularly suitable for advantageous production of thin products such as sheets made of paper, textile, fiber, and particle boards. However, the use of these presses for the cross-linkage of sheets made of rubber or thermoplastics has also been known for a long time. In contrast to calender lines, these presses are usually applied in those cases where the short-term exertion of a linear pressure on the material sheet during its passage between two rolls would not be sufficient to expose the material to the desired cross-linking conditions.

Especially when using these presses for the production of particle boards of major thicknesses and/or relatively high material densities, however, the maximum contact pressure, which is limited by the tensile strength of the steel belt proved to be too low. The suggestions which have been made so far for increasing the contact pressure of the steel belt were not suitable for continuously producing particle or fiber boards of a high density. The producers as well as the processing industry have increasingly sought a process for the production of boards which have improved homogeneity and an optimized density profile over the board width in order to obtain products with a higher mechanic stability. However, such a process requires a considerably increased contact pressure acting on the material sheet, compared to apparatuses known in the art.

The German Published Application 41 03 342 discloses a device of this general kind in which the contact pressure exerted by the steel belt on the material is increased by a multitude of rollers with a roller chain. However, the described device presents the disadvantage that once the rollers are worn, the steel belt is damaged and it is not possible to check the rollers when mounted.

SUMMARY OF THE INVENTION

While avoiding the disadvantages of this known device, the invention seeks to improve a continuous press of this kind such as to allow the production of sheets made of substances which are also subject to a major thickness reduction during the pressing process, and to obtain an improved homogeneity of the material density relative to the thickness of the board.

This task is solved by the present invention in which a stationary supplemental pressing device is located outwardly of the endless steel belt along a substantial portion of the arcuate length of the endless belt. The supplemental pressing device comprises an elastic steel belt section having a pressing surface adapted to engage the adjacent surface of the endless belt. The elastic steel belt section is mounted in tension on the press frame. An opening is formed in the steel belt section, and a pipe is mounted in the opening. Compressed air or water vapor is delivered to the interface between the endless belt and the steel belt section, and a lubricating fluid film is formed at the interface. The film reduces the friction between the circulating endless steel belt and the stationary steel belt section.

The material press of the invention allows the contact pressure exerted on the material sheet to increase to such a degree that the desired density homogeneity within the material is obtained and the strength properties of the material produced are thus improved. Moreover, the press of the invention is also suitable for the continuous production of material sheets of a relatively high thickness (up to approximately 12 mm) with the same mechanical strength properties that have usually been achieved in the past only with sheets of thinner material.

It is of special importance that the material press of the invention allows the contact force exerted on the material sheet to be increased from the range of 20 to 60 N/cm$^2$, which has been attained so far by existing machines, to approximately 100 to 200 N/cm$^2$, despite the relatively simple and inexpensive mechanical design of the additional pressing device.

In order to increase the contact force, compressed air or water vapor is injected through an opening which is arranged in a determined position of the steel belt section and connected by means of a flange to a tubular line. A sliding film which considerably reduces the friction between the stationary steel belt section and the circulating endless steel belt of the press is thus formed on the relevant steel belt section. The air or water vapor leakage is surprisingly low.

The friction values are additionally reduced by providing grooves which communicate with the feed opening for compressed air or water vapor. Due to a star-shaped arrangement of the grooves and an additional continuous groove which is provided at the edge of the steel belt section and connected to the grooves leading towards the outside in the form of a star, a further improvement of the friction values is obtained.

For fixing the steel belt sections over a certain part of the wrapping length of the endless steel belt around the central drum, these sections are connected with one end directly to the frame of the material press while their other end is linked with the frame by means of tensioning devices.

The tensioning devices arranged at one end are not only designed for fixing the steel belt sections above the circulating endless steel belt, but mainly for subjecting these steel belt sections to a high tensile stress. This measure results in an additional force which is directed towards the axis of rotation of the central drum and causes an increase in the pressure acting on the material to be pressed.

Owing to the fact that the steel belt sections are subdivided into single strands, the contact pressure exerted on the material to be pressed can be controlled independently in each individual section. Moreover, the maintenance and the change of these individual strands are easier to be carried out and involve only minor costs.

For further improving the friction values and the physical and chemical cross-linking conditions in the material press, water vapor can be applied instead of compressed air. In this case, the accessory electrical heating devices can also be omitted which allows an additional improvement of the friction values to be obtained.

Another advantage of the invention consists in the fact that the pressing device is easily accessible and involves rather low material requirements. Moreover, a material press equipped with such a pressing device is perfectly suitable for the production of material sheets of different thickness since the steel belt sections are easily adaptable to the changing pressing radii which result from the different material thicknesses.

Finally, the suspension of the flexible steel belt sections ensures a reliable protection against mechanical damage, as these sections can be easily moved away from the central drum in case solid matter should unintentionally get between the steel belt sections and the circulating endless steel belt.

BRIEF DESCRIPTION OF THE DRAWINGS

Embodiments of the invention will be described with particular reference to the application drawings in which:

FIG. 3a is a diagram of tests carried out with the steel belt section of FIG. 3;

FIG. 4a is a diagram of tests carried out with the steel belt section of FIG. 4.

DETAILED DESCRIPTION OF THE PREFERRED EMBODIMENT

Figure 1:
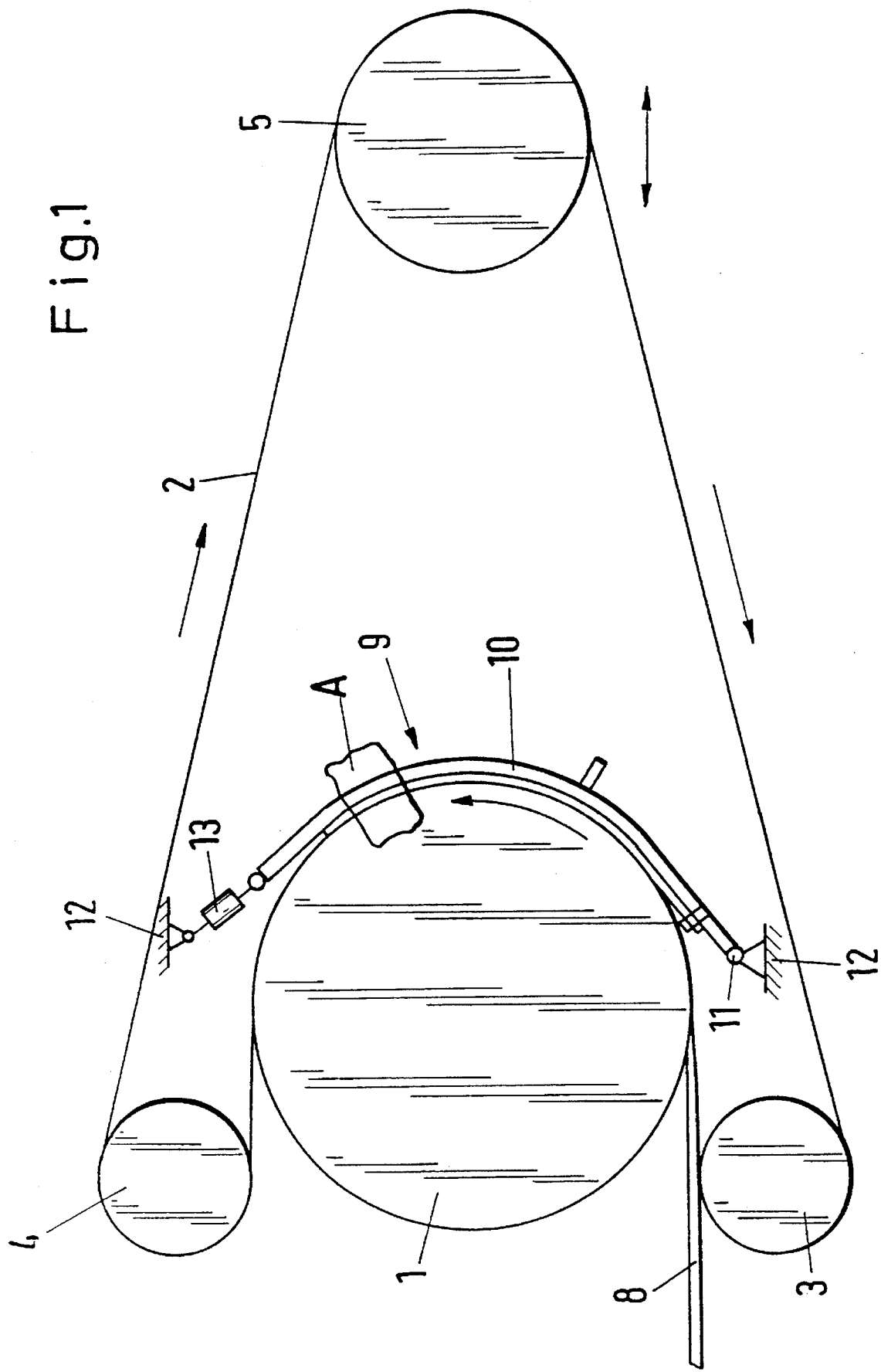
FIG. 1 is a schematic side view of the material press of the present invention, including the additional pressing device.

The continuous material press shown in FIG. 1 comprises a heated or cooled and driven central drum 1, two reversing drums 3, 4, a tensioning drum 5, an endless steel belt 2, an additional pressing device 9, as well as a frame 12 of the press which is only outlined in the drawing.

The steel belt 2 is led in a known manner around the central drum 1, the reversing drums 3, 4, and the tensioning drum 5 such as to ensure that an endless material sheet 8, which is introduced between the steel belt 2 and the shell surface of the central drum 1, is moved together with the heated central drum 1. During the contact with the drum shell, this material sheet is exposed to preselected temperatures as well as to a defined surface pressure caused by the tensioned steel belt 2.

For increasing the contact pressure of the steel belt 2, steel belt sections 10 forming the additional pressing device 9 are provided along a certain part of the contact length between the material sheet 8 and central drum 1.

One end of the steel belt sections 10 is connected to the frame 12 preferably by means of a hinge 11, while the other end is linked to this frame 12 by at least one tensioning device 13. The tensioning devices 13 are preferably designed as piston cylinders and exert a high tensile force on the steel belt sections 10 and the material to be pressed 8.

Figure 2:
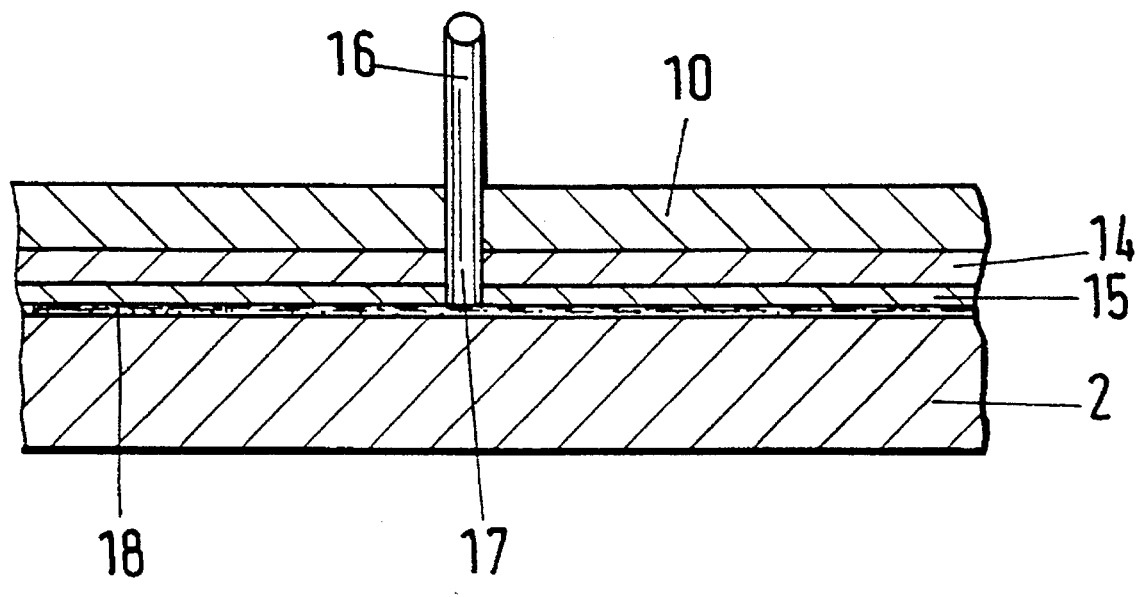
FIG. 2 is a cross-sectional view of the additional pressing device, taken at A in FIG. 1.

FIG. 2 illustrates in cross-section a part of the endless steel belt 2 and the steel belt section 10. In this embodiment, the steel belt section 10 is provided with a supporting layer 14. In addition, an extremely thin sliding layer 15 with emergency running properties is applied to the supporting layer 14 in order to ensure that no major damage is caused by a failure in the compressed air supply.

A joining pipe 16 is connected to an opening 17 extending through the steel belt section 10, the supporting layer 14, and the sliding layer 15. The joining pipe 16 is connected to a compressed air or water vapor source (conventional and accordingly not shown in the drawings), so that a lubricating film 18 can be delivered under pressure to the space formed between the endless steel belt 2 and the layer 15 having the emergency running properties.

Figure 3:
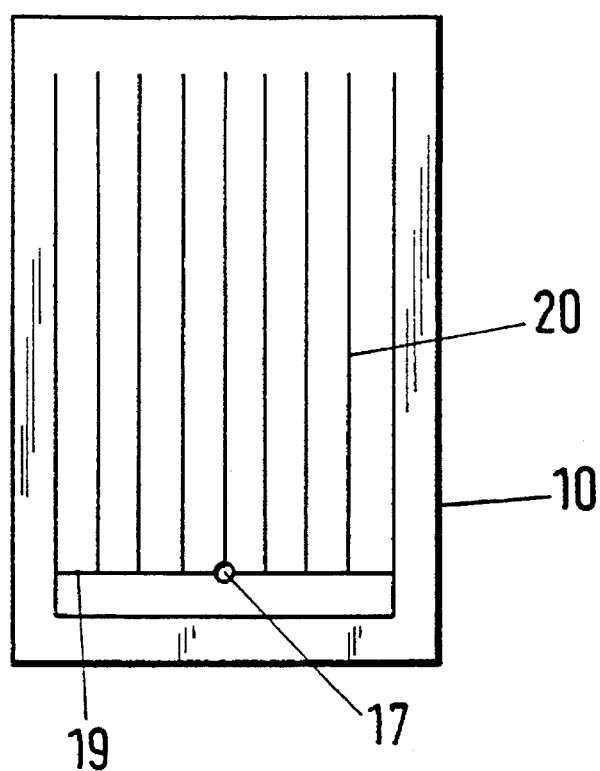
FIG. 3 is a top plan view of a steel belt or a steel plate section provided with grooves.
Figure 4:
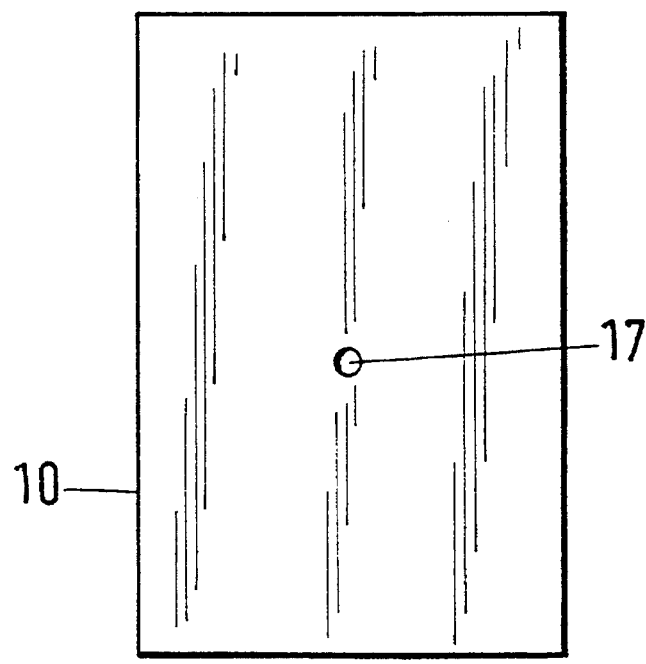
FIG. 4 is a top plan view of a steel belt section with only one opening and without grooves.

FIGS. 3 and 4 are top views of the steel belt sections or section 10. In the case of the embodiment shown in FIG. 3, the steel belt sections, including the supporting layer 14 and the layer 15, are provided with small grooves 20. Water vapor, for example, is injected through the opening 17 and penetrates via the cross grooves 19 into the longitudinal grooves 20 such as to form a lubricating film 18 built up by supporting vapor.

FIG. 3a shows a diagram based on tests carried out with a steel belt section 10, as shown in FIG. 3. This diagram shows that at a speed of 25 m/min of the endless belt 2 improved pressure values at lower friction values were obtained with the supporting vapor. However, good friction values ensuring a correspondingly high surface pressure are also obtained when supporting air is used.

A definite improvement was achieved with a steel belt section 10 that was not provided with grooves. An opening without any grooves was arranged approximately in the center of the surface 10, as shown in FIG. 4. The results obtained are shown in the diagram in FIG. 4a. It is rather surprising that in this case nearly the same values were obtained with supporting air and with supporting vapor, the pressure values of both pressure agents being similar but at an even higher level.

A particular advantage of the additional pressing device 9 consists in the fact that the steel belt 2 is subjected to a very even surface pressure and that the individual control of single steel belt sections 10 allows the additional contact pressure exerted on the material sheet 8 to continuously increase, or to be reduced from a very high level.

We claim:

1. A continuously operating material press for producing endless composite, particle, fiber, rubber and plastic sheets and paper or substances impregnated with synthetic resin, comprising:

a driven central drum having an outer shell surface, and means for heating and cooling the same, reversing drums and a tensioning drum spaced from said central drum, a circulating endless steel belt tensioned around and engaging a substantial portion of said central drum, and extending around said reversing and tensioning drums, the material to be processed into sheet form being guided into the space between said endless belt and said shell surface of said central drum and pressed in the region of said shell surface tightly engaged by said tensioned steel belt, and a stationary supplemental pressing device outwardly of said steel belt along a substantial portion of the arcuate length of said belt which engages the shell surface of said central drum, said supplemental pressing device comprising an elastic steel belt section having a pressing surface adapted to engage the adjacent surface of said endless belt, and means for mounting said pressing device in tension around said endless belt, an opening formed in said steel belt section extending entirely therethrough, and a pipe mounted in said opening, said pipe terminating at its inner end at the adjacent surface of said endless steel belt, and communicating at its outer end with a source of compressed fluid the delivery of which through said pipe results in the formation of a lubricating fluid film at the interface of the endless steel belt and the adjacent surface of said steel belt section, said film reducing the friction between said circulating endless steel belt and the stationary steel belt section.

2. The continuous material press according to claim 1, wherein the side of the steel belt section facing said endless steel belt is provided with fluid guiding grooves which communicate with said opening in said steel belt section, and wherein said compressed fluid comprises compressed air or water vapor.

3. The continuous material press according to claim 1, wherein said pressing surface of said steel belt section is formed with longitudinal and cross grooves connected to said opening formed in said steel belt whereby compressed fluid can be delivered to said longitudinal and cross grooves.

4. The continuous material press according to claim 3, wherein said cross grooves communicate with said opening for compressed fluid, and said cross grooves are connected to said longitudinal grooves.

5. The continuous material press according to claim 1, wherein said material press includes a frame and said elastic steel belt section has opposed first and second ends, the first end of said steel belt section being connected directly to said press frame, said second end of said elastic steel belt section being connected to said frame through a hydraulic or pneumatic cylinder by means of which the tension on said elastic steel belt section can be variably adjusted so as to adjustably increase the pressure acting on the material to be pressed.

6. The continuous material press according to claim 1, wherein said elastic steel belt section is provided at its pressing surface with a sliding layer having emergency running properties, thereby minimizing damage in the event of a failure in the compressed fluid supply.

7. The continuous material press according to claim 6, wherein the elastic steel belt section further includes a steel layer and a supporting layer positioned between said steel layer and said sliding layer.

* * * * *